ABSTRACT OF THE DISCLOSURE

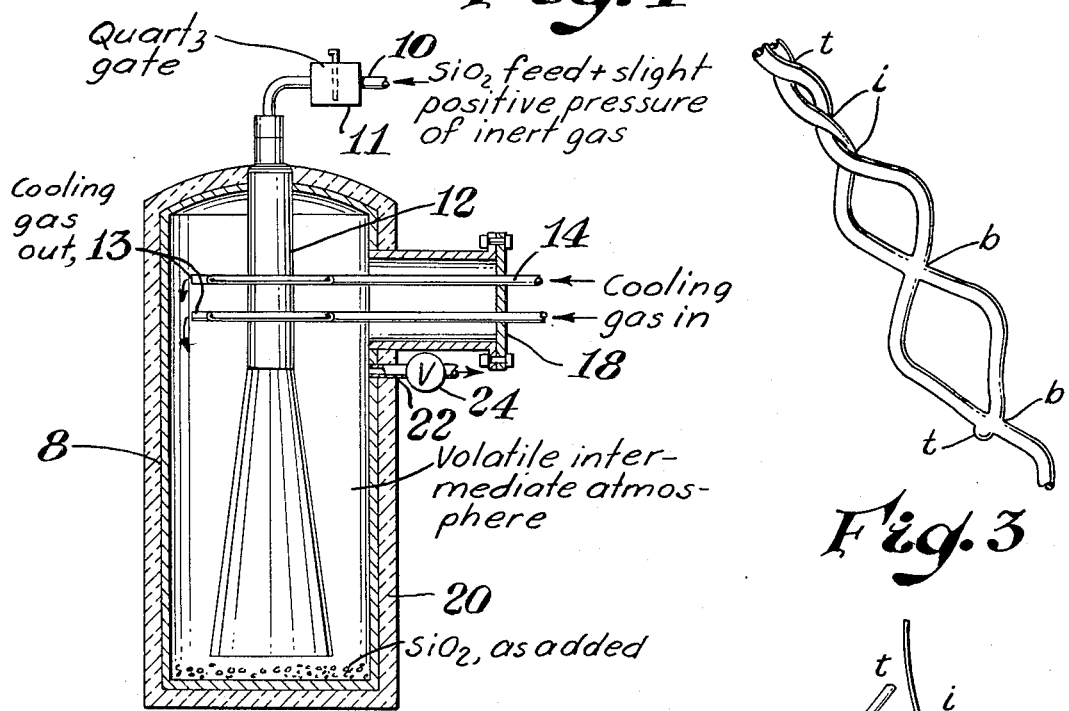
Fig. 1
Fig. 2
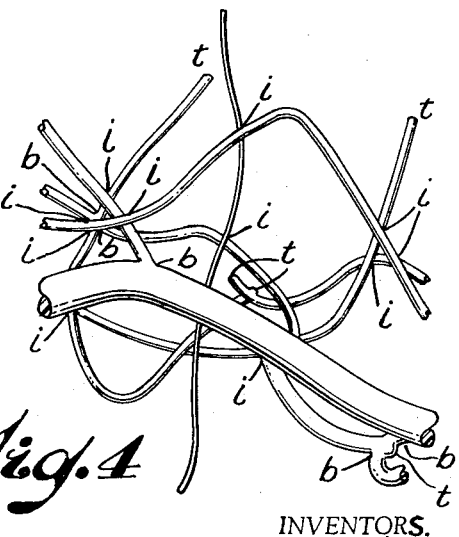
Fig. 3
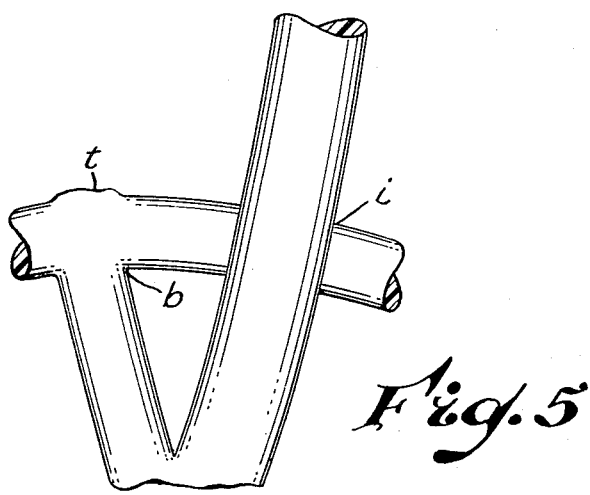
Fig. 5
Fig. 4
INVENTORS.
James O. Huml
Gilbert S. Layne
BY C.W.Carlin
ATTORNEY 3,672,832
PRODUCTION OF POLYMERIC FIBERS OR COHERENT THIN DEPOSIT OF A SILICON AND OXYGEN COMPOUND
James O. Huml and Gilbert S. Layne, Midland, Mich., assignors to The Dow Chemical Company, Midland, Mich.
Continuation-in-part of abandoned application Ser. No. 691,430, Dec. 18, 1967. This application July 16, 1970, Ser. No. 55,590
Int. Cl. C01b 33/18, 35/14
U.S. Cl. 23—182 V
11 Claims

Polymeric silica is condensed as fibers on a polycrystal substrate or as a microfilm on a single crystal substrate by reacting a mixture consisting of a sulfur source, an oxygen source, a silicon source, and a hydrogen source, and optionally an inert carrier gas, in a suitable single or multiple-chambered closed reaction vessel equipped with a heating means for one portion or one chamber of the vessel and preferably a cooling means for another portion or chamber of the vessel, maintaining temperature and pressure conditions such that a volatile intermediate is formed in the heated portion or chamber and maintaining a temperature at least 20 centigrade degrees less, when at about one atmosphere pressure, in the cooler portion or cooler chamber, whereby $SiO_2$ fibers or a microfilm is formed by decomposing said volatile intermediate in the cooler portion of a single chamber or the cooler chamber of multiple chambers.

This application is a continuation-in-part of Ser. No. 691,430, filed Dec. 18, 1967, now abandoned.

BACKGROUND OF THE INVENTION

The invention relates to the converting and transporting of $SiO_2$ from a crude or readily available source to very fine fibers of a microfilm of a Si and O compound of a molar ratio of Si to O of about 0.5. The condensed product is not defined as silica because silica is considered to be crystalline whereas the Si and O condensed compound made according to the invention appears to be non-crystalline.

$SiO_2$ fibers are now available (sometimes referred to as quartz "wool"). They are in demand for use as temperature insulation. Heretofore they have been produced either by extrusion or drawing of melted $SiO_2$ or by vapor combustion of various halosilanes, e.g. $SiCl_4$, $HSiCl_3$, or $H_2SiCl_2$ with $O_2$. There is a continuing need for finer-fiber $SiO_2$ wool. There is a need for microfilms of a compound of silicon and oxygen in a Si/O ratio of about 0.5 to provide a dielectric coating for semi-conductor devices. There is also a continuing need for thinner microfilm coatings of such $SiO_2$.

The extrusion procedure for making fibers has not been fully acceptable because the extrusion must be carried out at about the melting point of silica, i.e. above 1,700° C. and the fibers produced are far too coarse, i.e. of greater diameter, than are acceptable for general use.

The known technique, employing vapor combustion of various halosilanes with $O_2$, is difficult to control in order to produce filaments or fibers. It also produces very corrosive side products which present serious problems in the maintenance of reactor components.

Also, heretofore, no fully satisfactory non-combustion method of producing microfilms on monocrystalline substrates is known to the industry.

An object of the present invention is to provide a method of preparing a fibrous silicon dioxide.

Another object is to provide a silicon dioxide product in the form of long, thin, noncrystalline fibers.

THE INVENTION

The invention broadly stated is a method of producing fine fibers or a microfilm of substantially non-crystalline $SiO_2$ by heating source material capable of producing a gaseous intermediate comprising forms of Si, S, O, and H, which transports and converts crystalline $SiO_2$ to a substantially noncrystalline monofilm or monofilament. The source material should provide a molar ratio of Si/O+S of at least 0.5 and an excess of H to insure its continued presence in the molecular form, viz $H_2$.

More specifically the invention comprises heating sources of silicon, sulfur, oxygen and hydrogen in a suitable chamber, while maintaining temperature and pressure conditions such that a volatile intermediate is formed, which (when cooled) forms polymeric $SiO_2$. For example, at about one atmosphere of pressure a temperature within the range of from about 850° C. to about 1500° C., preferably about 1200° C. and not in excess of about 1500° C., is established and maintained in one portion of a chamber while maintaining concurrently a lower temperature at substantially the same pressure in another portion of the chamber. A minimum temperature differential of 20 centigrade degrees is required. A temperature differential of at least 100 centigrade degrees is preferred. Pressures greater or less than one atmosphere can be used. Lower pressures permit the use of lower temperatures in the heated zone and conversely, higher pressures require higher temperatures.

The source materials chosen to supply Si, S, O, and H may consist of elements themselves or compounds containing two or more members of the required elements, exclusive of other elements except that inert gases, e.g. He, Ar or the like may desirably be present to alter the deposition rate. It is preferable that an excess of silicon and hydrogen be present sufficient to react with all the available sulfur present. The hydrogen appears to serve as a necessary reducing agent. If desired, all the oxygen and a substantial portion of the Si may be supplied as a conveniently available form of $SiO_2$, e.g. sand, particulated quartz, or silica flour. Some operable sources of the required reaction elements and combinations of elements are:

sulfur source: S, $SO_2$, $SiS_2$, SiS, $H_2S$, $H_2SO_4$;
oxygen source: $O_2$, SiO, $SiO_2$, $SO_2$, $H_2O$, $H_2SO_4$, $H_2SiO_3$;
silicon source: Si, SiO, $SiO_2$, SiS, $SiS_2$, $SiH_4$, $H_2SiO_3$;
hydrogen source: $H_2$, $H_2S$, $H_2O$, $H_2SiO_3$, $SiH_4$, $H_2SO_4$.

As aforesaid, such sources must be employed as to provide a molar ratio of Si to the combined sum of O+S of at least 0.5.

The amount of S in the reaction mixture is not critical. The sulfur seems to serve as a catalyst in the gaseous reactive transport system; it does not appear in the end product in more than trace amounts. One atom of S per 100 atoms of O is sufficient. Excess sulfur, e.g. 100 atoms per atom of O, is not harmful but is unnecessary.

A polymeric form of $SiO_2$ is deposited by the practice of the invention. Whether the deposit is in the form of filaments, giving the appearance of extremely fine textured substantially white wool, or in the form of a thin substantially transparent film, is dependent on the character of the deposition site: a polycrystalline site such as quartz, mullite or graphite promotes the formation of polymeric filaments or fibers whereas a monocrystalline site, such as semi-conducting silicon or germanium metal or GaAs, or CdS, or the like, promotes the formation of polymeric microfilm.

A specific embodiment of the invention comprises heating $SiO_2$ in an atmosphere formed by the reaction of $H_2S$ and Si metal, in one part of a quartz vessel to a temperature of at least about 1100° C. (preferably at least 1200° C.) while maintaining the temperature in another part of the vessel at least 20° C. and preferably at least about 100° C. lower than that in the heated part. The Si should be present in at least the amount required to convert all of the $H_2S$ to SiS and $H_2$. The sum of the partial gas pressures present should be at or about 1 atmosphere total pressure.

Although the invention is not dependent on a theory, it is thought that the following reactions occur:

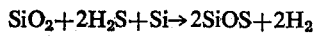

(as gases in the hot zone); $2SiOS + H_2 \rightarrow SiO_2$ (polymeric form) $+ SiS + H_2S$ (in the cold zone). The required molar ratio, above stated, is observed. Indications are that the following equilibrium reaction is occurring:

Examination of the suggested equations indicates that at least one volatile intermediate is made by the reaction of $H_2S$ and Si to provide the reaction atmosphere. Nothing additional need be added except a feed source of $SiO_2$ since Si and $H_2S$ are reaction products and therefore continue to form the desired reaction atmosphere.

As aforesaid, such sources must be employed in amounts to provide a molar ratio of silicon to the sum of oxygen+sulfur greater than 0.5.

The vessel may be positioned in a pressure chamber if desired so that positive pressure may be maintained about the bomb to insure safety when employing a correspondingly high pressure of $H_2S$ inside the vessel, or alternatively, the pressure in the vessel may be at or less than atmospheric. Lower reaction pressures require lower reaction temperatures. Heating is provided for one part of the reaction vessel by any of several known means, e.g. by subjecting one end of the vessel or bomb to the radiation action of an electric furnace. A cooling means for the other end of the bomb is supplied and may be subjected to either heat radiating conditions or some type of refrigeration, e.g. a circulating inert gas such as He or Ar, although such greater cooling is usually not necessary. If preferred, as in a continuous process, an entire chamber may be subjected to heat, e.g. by an electric coil and a cooling site provided by inserted cooled plates or tubes.

The mechanism of the growth of the $SiO_2$ fibers or of the cohesive thin film is not understood but involves all of the elements of H, S, Si and O in the formation of a gaseous intermediate and subsequent deposition of a silicon and oxygen compound therefrom.

The fibers made according to the invention, by electron microscopic examination, show the diameters of different fibers to vary from about 0.09 up to about 10.0 microns although seldom is any in excess of about 2 microns. However, such examination shows the diameter of a given fiber to be substantially uniform, a single fiber varying but little in diameter. The fibers are, in general, of great length and have an average length to diameter ratio of at least 100 and approaching infinity. Some fibers show branching. The direction of branching is substantially normal, i.e. 90°, to the fiber length. X-ray diffraction analysis reveals the fibers to be non-crystalline. Analysis of the $SiO_2$ fibers by X-ray fluorescence techniques shows them to comprise 40 to 50 percent Si, less than 1 percent, usually about 0.4 percent sulfur, and the balance substantially oxygen. Examination with a polarizing microscope revealed birefringence, i.e. parallel extinction along the fiber length. The fibers were subjected to open flame heating to about 1200° C. in air with no apparent effect. They appear to consist essentially of long O-Si-O chains in substantial alignment.

FIG. 1 of the drawing depicts a quartz bomb-type reaction vessel having a lower temperature in one end than in the other end. The vessel contains $H_2S$ gas. Particulated silicon metal and a crude form of $SiO_2$ (sand), in sufficient amounts to provide a molar ratio of Si to O+S of at least 0.5, are shown being heated in one end and $SiO_2$ fibers being formed in the cooler end of the vessel.

FIG. 2 of the drawing depicts a quartz reaction vessel 8 for use in a continuous operation wherein there are shown a common form of crystalline $SiO_2$ in the bottom and an atmosphere, comprising the volatile intermediate which appears to comprise $SiS_2$, SiS, $H_2$ and SiOS. The vessel is provided with a port 10 (controlled by sliding quartz gate 11) and centrally located feed compartment 12 into and through which $SiO_2$, e.g. sand or silica flour, is introduced. The vessel is provided with quartz condensation prongs or forks 14 which are advantageously hollow tubes into which an inert cooling medium, e.g. argon or helium gas, can be introduced and which is emitted at 13 into the vessel. The prongs 14, upon which fibrous $SiO_2$ condenses from the volatile intermediate atmosphere, can be removed for recovery of the fibrous $SiO_2$ by removal of control plate 18. Heat is provided to vessel 8 by electric furnace 20 positioned about the vessel. Outlet port 22, provided with a pressure relief valve 24, for emitting inert gas from the atmosphere of the vessel, is shown.

FIGS. 3, 4 and 5 are sketches of photographs showing enlarged views of the $SiO_2$ fibers made according to the invention, showing both intertwining of individual polymeric strands or fibers, indicated generally by $i$, branching strands, indicated generally by $b$, and termination growth indicated generally by $t$. The tendency to branch at substantially right angles can be seen on the figures, although stress placed on the strands sometimes tends to change that angle.

The following examples illustrate the practice of the invention.

EXAMPLE 1

This example was conducted to show a batch practice of the invention.

A quartz bomb of the nature of that shown in FIG. 1 is charged at one end with particulated silicon metal and $H_2S$ gas to provide a molar ratio of about 4 moles of $H_2$, 1 of $SiS_2$ and 2 of SiS at about atmospheric pressure and at about 1200° C. $SiO_2$ in the form of sand is added and the bomb sealed. The end of the bomb containing the charge is then heated to at least 1200° C. The other end or zone of the bomb is maintained at between about 100 and 200 centigrade degrees below that of the heated zone.

Fibers of $SiO_2$ condense within the cooler end zone. When the $SiO_2$ charge has largely been transported by the gaseous medium to the cooler quartz site, heat is discontinued and the bomb opened, as by melting or cutting a convenient hole therein.

The fibers so made are of extremely fine texture consisting of long polymeric strands of $SiO_2$ suitable for insulation, particularly when subjected to high temperatures. They may also be spun into yarn and the resulting yarn woven into useful high temperature fabric.

EXAMPLE 2

This example illustrates a continuous practice of the invention.

Particulate Si metal and $H_2S$ gas are charged into a vessel of the nature of that shown in FIG. 2 of the drawing, e.g. through port 10. Heat is applied to raise the temperature of the charge to about 1200° C. A cooling medium may advantageously be supplied through prongs 14. After the vessel is up to temperature, $SiO_2$ is introduced through port 10. A small pressure of inert gas and/or of $H_2$ may be applied if desired through port 10 while the $SiO_2$ is being introduced therethrough.

$SiO_2$ fibers collect on prongs 14. After the collection thereof is built up to a convenient quantity, plate 18, and then prongs 14 are removed and fibers removed from the prongs which are thereafter replaced and the plate secured in position.

Example 2 shows that the invention lends itself to large scale substantially continuous production of the insulating $SiO_2$ fibrous material.

EXAMPLE 3

This example illustrates the deposition of a cohesive continuous polymeric film of $SiO_2$ of microscropic thickness useful for coating monocrystalline materials.

A vertically positioned quartz tube reactor was loaded as follows: (1) crushed silicon metal and crushed quartz ($SiO_2$) were supplied at the bottom of the reactor, (2) a gas delivery tube was inserted from the top of the reactor and positioned so the lower and open end thereof was submerged in the silicon-silica mixture, (3) a length of pure semi-conductor grade monocrystalline silicon was inserted parallel to the gas delivery tube to serve as the collection site for transported $SiO_2$. Heat was supplied by external electrical resistance to the reactor in such a way that a heat gradient was established along the length of the reactor. The portion of the reactor containing the silicon-silica feed material was maintained at 1210° C. while the temperature along the length of pure semi-conductor silicon decreased substantially uniformly from 1210° C. to less than 900° C. A mixture of equal volumes of $H_2S$ and helium gases was supplied through the delivery tube to the silicon-silica mixture at a rate of about 10 cc. per hour. These conditions were maintained for 4 hours. The reactor was then cooled and the contents examined. A very thin gray to white cohesive deposit was found to have uniformly covered the entire surface of the silicon plate. Further examination and measurements of the silica microcoating revealed it to be a film of a thickness of not over about 3 microns. The film covered silicon was thereafter tested by subjecting it to the action of concentrated nitric acid; it was unaffected thereby. It was further tested and found to be highly resistant to concentrated aqueous HF solutions. Electrical resistivity measurements revealed the silica covering to have dielectric properties similar to quartz.

Comparative tests

Bomb-type tests were run, employing apparatus and procedure similar to those employed in Example 1 except that materials not fully in accordance with the invention were used.

Comparative test A

In this test, the source materials employed were S, Si and $SiO_2$.

Comparative test B

Source materials employed were $SiO_2$ and $H_2$.

Comparative test C

Source materials employed were $H_2S$ and $SiO_2$ wherein the ratio of Si/S+O is less than 0.5.

Comparative test D

Source materials employed were Si, Ar, and $SiO_2$.

None of the comparative tests A through D produced fibrous $SiO_2$, thereby showing that each of Si, O, H and S are required in the prescribed proportions.

Comparative test E

Source materials employed were those identified by the practice of the invention but in a molar ratio of Si/O+S of less than 0.5. There appeared to be only stable species of $H_2$, $SiS_2$ and $SiO_2$ formed in the atmosphere and no fiber or microfilm was produced.

What is claimed is:

1. The method of producing high purity polymeric form of silica comprising charging a vessel, adapted to being maintained at a higher temperature in one part thereof into which source materials are provided than in a cooler second part containing a deposition site, with a reaction mixture consisting of source materials yielding silicon, sulfur, hydrogen, and, oxygen in amounts sufficient to provide and maintain a reactive atmosphere comprising gaseous compounds containing Si, O, S and H in amounts of each to provide an atom ratio of Si/O+S of at least 0.5, and at least one atom of S per 100 atoms of O; and an excess of hydrogen source to insure the presence of elemental or molecular hydrogen, said source materials selected as follows: (a) the source material yielding silicon being selected from the class consisting of Si, $SiH_4$, SiO, $SiO_2$, $SiS_2$, $H_2SiO_3$ and SiS; (b) the source material yielding sulfur being selected from the class consisting of S, $SO_2$, $SiS_2$, SiS, $H_2SO_4$, and $H_2S$; (c) the source material yielding hydrogen being selected from the class consisting of $H_2$, $H_2S$, $H_2O$, $H_2SiO_3$, $SiH_4$ and $H_2SO_4$; and (d) the source material yielding oxygen being selected from the class consisting of $O_2$, SiO, $SiO_2$, $SO_2$, $H_2O$, $H_2SO_4$ and $H_2SiO_3$; and from none to a continuous flow of an inert gas, heating to and maintaining the charge of source materials at a temperature of from about 850° C. to about 1500° C. to yield intermediate gaseous reaction products that deposit $SiO_2$ upon cooling, and concurrently maintaining the temperature of the second part of the vessel at a temperature of at least 20 centigrade degrees less than that of the charge of source materials, whereby, through a series of reactions of the source materials, an intermediate atmosphere is formed from which said cohesive polymeric silica is deposited on the deposition site in the cooler second part of the vessel.

2. The method according to claim 1 wherein the $SiO_2$ product is deposited on a site maintained at a temperature of at least about 100 centigrade degrees lower than the temperature of the charge of source materials.

3. In the practice of the invention according to claim 1 wherein the deposition of said $SiO_2$ product is caused to occur on a polycrystalline deposiiton site as $SiO_2$ fibrous material having an average ratio of fiber length to diameter of at least about 100.

4. In the practice of the invention according to claim 1 wherein the deposition of said $SiO_2$ product is caused to occur on a monocrystalline deposition site as a cohesive film.

5. The method according to claim 1 wherein the charge of source materials is elemental Si, $H_2S$, and a natural form of $SiO_2$ and the Si is present in an amount at least sufficient to convert the $H_2S$ to SiS and $H_2$.

6. The method according to claim 1 wherein the natural form of $SiO_2$ is selected from the class consisting of silica flour, sand, and pulverized quartz.

7. The method according to claim 1 wherein said charge of source material is heated at substantially one atmosphere to at least 1200° C. and below 1500° C. and the second and cooler part of the vessel is maintained at a temperature at least 100 centigrade degrees less than said charge.

8. The method according to claim 1 wherein the method is made continuous by providing a hydrogen sulfide atmosphere over silicon metal and then substantially continuously feeding a source of silica in a particulated state into said vessel to maintain the molar ratio of Si/O+S of at least 0.5 and periodically removing the $SiO_2$ product deposited on the deposition site in the cooler part of the vessel.

9. The method according to claim 1 wherein the reacting atmosphere contains an inert gas.

10. In a method of producing a polymeric fine strand silicon dioxide compound by heating a crude source feed material containing silicon, sulfur, hydrogen and oxygen in elemental or combined form to a temperature sufficiently high to vaporize said feed material but below about 1500° C. and converting said feed material to a vapor which serves as a transitory vaporous transport system but which precipitates said fine strand silicon dioxide at a lower temperature than said feed material:

the improvement comprising limiting the reactive components in said feed material to, but requiring the presence of each of elemental or chemically combined H, O, Si and S in such proportions that Si/O+S is at least 0.5; source materials of H, O, Si and S selected as follows: (a) the source material yielding silicon being selected from the class consisting of Si, $SiH_4$, SiO, $SiO_2$, $SiS_2$, $H_2SiO_3$ and SiS; (b) the source material yielding sulfur being selected from the class consisting of S, $SO_2$, $SiS_2$, SiS, $H_2SO_4$, and $H_2S$; (c) the source material yielding hydrogen being selected from the class consisting of $H_2$, $H_2S$, $H_2O$, $H_2SiO_3$, $SiH_4$ and $H_2SO_4$; and (d) the source material yielding oxygen being selected from the class consisting of $O_2$, SiO, $SiO_2$, $SO_2$, $H_2O$, $H_2SO_4$ and $H_2SiO_3$; whereby the fine strand $SiO_2$ solid is produced.

11. A new fibrous material consisting essentially of polymeric $SiO_2$ which:
   (a) has an average maximum fiber diameter of less than 10 microns;
   (b) has an average ratio of fiber length to fiber diameter of at least about 100;
   (c) is sufficiently flexible to be spun;
   (d) consists by weight of between 40 percent and 50 percent Si, a measurable amount of S less than about 0.4 percent and the remainder substantially O;
   (e) exhibits birefringence along its fiber length;
   (f) displays 90° branching; and
   (g) is noncrystalline.

References Cited
UNITED STATES PATENTS 3,385,915   5/1968   Hamling ---------- 23—182 X OSCAR R. VERTIZ, Primary Examiner H. S. MILLER, Assistant Examiner U.S. Cl. X.R.

106—69